United States Patent
Anglin et al.

(10) Patent No.: US 10,364,880 B2
(45) Date of Patent: Jul. 30, 2019

(54) OIL QUIETING DIRECTION CONTROL BAFFLE

(71) Applicant: United Technologies Corporation, Farmington, CT (US)

(72) Inventors: Christopher T. Anglin, Manchester, CT (US); Christopher M. Valva, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 289 days.

(21) Appl. No.: 15/399,259

(22) Filed: Jan. 5, 2017

(65) Prior Publication Data

US 2018/0187770 A1    Jul. 5, 2018

(51) Int. Cl.
| F16H 57/04 | (2010.01) |
| F01D 15/12 | (2006.01) |
| F01D 25/18 | (2006.01) |
| F02C 7/32  | (2006.01) |

(52) U.S. Cl.
CPC ......... *F16H 57/0423* (2013.01); *F01D 15/12* (2013.01); *F01D 25/18* (2013.01); *F02C 7/32* (2013.01); *F05D 2220/32* (2013.01); *F05D 2240/126* (2013.01); *F05D 2240/60* (2013.01); *F05D 2260/403* (2013.01); *F05D 2260/532* (2013.01); *F05D 2260/97* (2013.01); *F05D 2260/98* (2013.01)

(58) Field of Classification Search
CPC ...... F16H 57/0423; F01D 15/12; F01D 25/14; F02C 7/32; F05D 2240/126; F05D 240/60; F05D 2260/403; F05D 2260/532; F05D 2260/97; F05D 2260/98; F05D 2220/32
See application file for complete search history.

(56) References Cited

U.S. PATENT DOCUMENTS

| 2,017,871 | A  | 10/1935 | Strain |
| 3,942,387 | A  | 3/1976  | Stone et al. |
| 4,667,774 | A  | 5/1987  | Roberge |
| 6,467,578 | B1 | 10/2002 | Winfree |
| 7,341,426 | B2 | 3/2008  | Schwarz et al. |
| 7,386,983 | B2 | 6/2008  | Miller |
| 7,500,365 | B2 | 3/2009  | Suciu et al. |
| 7,971,507 | B2 | 7/2011  | Swainson |

(Continued)

FOREIGN PATENT DOCUMENTS

| EP | 1610036 A2 | 12/2005 |
| GB | 2223819 A  | 4/1990  |

OTHER PUBLICATIONS

Extended European Search Report for EP Application No. 17208638.1, dated May 25, 2018, 7 Pages.

*Primary Examiner* — Michael R Mansen
*Assistant Examiner* — Robert T Reese
(74) *Attorney, Agent, or Firm* — Kinney & Lange, P.A.

(57) ABSTRACT

A baffle includes a disk, a rim, a peripheral portion, and an outlet. The rim is connected to and circumferentially surrounds a portion of the disk. The peripheral portion is connected to and circumferentially surrounds the rim. The peripheral portion forms a channel. The outlet is fluidly connected to the channel of the peripheral portion. The outlet includes a cover and a series of openings. The cover caps a distal end of the outlet. The series of openings is disposed on a portion of the outlet and is fluidly connected to the channel via the outlet.

17 Claims, 7 Drawing Sheets

(56) References Cited

U.S. PATENT DOCUMENTS

| | | |
|---|---|---|
| 7,984,791 B2 * | 7/2011 | Taguchi .............. F16H 57/0483 |
| | | 184/11.1 |
| 8,011,883 B2 | 9/2011 | Schwarz et al. |
| 8,333,678 B2 | 12/2012 | McCune |
| 8,585,538 B2 | 11/2013 | Sheridan et al. |
| 8,919,134 B2 | 12/2014 | Tatman et al. |
| 8,973,465 B2 | 3/2015 | Duong |
| 9,068,515 B2 | 6/2015 | Duong et al. |
| 9,074,681 B2 | 7/2015 | Hanlon et al. |
| 9,115,650 B2 | 8/2015 | McCune et al. |
| 9,810,311 B1 * | 11/2017 | Zhang ................ F16H 57/0423 |
| 9,989,143 B2 | 6/2018 | Fomison |
| 2006/0048600 A1 | 3/2006 | Taguchi et al. |
| 2008/0236951 A1 * | 10/2008 | Alecu ..................... F01D 25/18 |
| | | 184/6.11 |
| 2009/0314580 A1 | 12/2009 | Jabs et al. |
| 2010/0038174 A1 | 2/2010 | Mordukhovich et al. |
| 2010/0140019 A1 | 6/2010 | Imai et al. |
| 2014/0064930 A1 | 3/2014 | NguyenLoc et al. |
| 2014/0169941 A1 * | 6/2014 | DiBenedetto ........... F01D 25/18 |
| | | 415/111 |
| 2015/0097073 A1 | 4/2015 | McPeak et al. |
| 2016/0230875 A1 | 8/2016 | Pankratov et al. |
| 2017/0146112 A1 * | 5/2017 | Anglin ....................... F02C 7/32 |
| 2018/0023684 A1 * | 1/2018 | Anglin ....................... F02C 7/32 |
| | | 74/423 |
| 2018/0149260 A1 * | 5/2018 | Singh ........................ F01P 3/20 |

* cited by examiner

OIL QUIETING DIRECTION CONTROL BAFFLE

BACKGROUND

The present disclosure relates to a transmission system and more particularly, to a baffle for meshing gears in a bearing compartment of a transmission system.

A gas turbine engine typically includes a transmission system for coupling one of its spools to an accessory gearbox. Such a transmission system includes a first bevel gear (often called the bull gear) mounted to a shaft of the spool. The transmission system also includes a tower shaft and an associated second bevel gear (often referred to as the bevel gear) mounted to a first end of the tower shaft, where a second end of the tower shaft is coupled to the accessory gearbox.

The transmission system also typically includes a baffle configured to cover at least a portion of the bevel gear. Such a baffle is provided so as to prevent surplus lubricant churning within the bearing compartment, in which the transmission system is located, from impinging on that portion of the bevel gear, since such surplus lubricant impingement typically increases windage and fluid drag on the bevel gear. However, such a baffle also captures and traps lubricant which is propelled off of the bevel gear, which causes power loss, efficiency reduction and heat generation as it churns, looking for an exit path from the baffle. This captured lubricant churns within the space between the bevel gear and the baffle and thereby causes windage and fluid drag on the bevel gear.

To prevent lubricant impingement, the baffle is installed around the first bevel gear. However, lubricant passing out of the baffle includes a large amount of energy that can be transferred to the gears and other rotating components within the compartment, which decreases the efficiency of the engine.

SUMMARY

A baffle includes a disk, a rim, a peripheral portion, and an outlet. The rim is connected to and circumferentially surrounds a portion of the disk. The peripheral portion is connected to and circumferentially surrounds the rim. The peripheral portion forms a channel. The outlet is fluidly connected to the channel of the peripheral portion. The outlet includes a cover and a series of openings. The cover caps a distal end of the outlet. The series of openings is disposed on a portion of the outlet and is fluidly connected to the channel via the outlet.

A transmission assembly includes a first gear, a second gear, and a baffle. The first gear includes a first set of gear teeth. The second gear includes a second set of gear teeth meshed with the first set of gear teeth. The baffle surrounds a subset of the second set of gear teeth and includes a disk, a rim, a peripheral portion, a slot, and an outlet. The rim is connected to and circumferentially surrounds a portion of the disk. The peripheral portion is connected to and circumferentially surrounds the rim. The peripheral portion forms a channel. The slot is disposed in the peripheral portion and is in fluid communication with the second set of gear teeth. The slot is configured to allow lubricant to flow through the slot and into the channel. The outlet is fluidly connected to the channel of the peripheral portion. The outlet includes a cover and a series of openings. The cover caps a distal end of the outlet. The series of openings is disposed on a portion of the outlet and is fluidly connected to the channel via the outlet.

DETAILED DESCRIPTION

A baffle with a cover at the end of an outlet pathway and a series of holes in the side of the outlet pathway is disclosed herein. The combination of the cover and the holes on the outlet pathway slows down the lubricant as the lubricant exits the outlet, allowing the lubricant to exit from the baffle with less energy than it otherwise would, thereby increasing the efficiency of the engine. The proposed baffle design will allow the scavenge lubricant to drain out of the baffle outlet instead of being expelled at a high velocity, which will reduce lubricant windage and decrease lubricant impingement.

Figure 1:
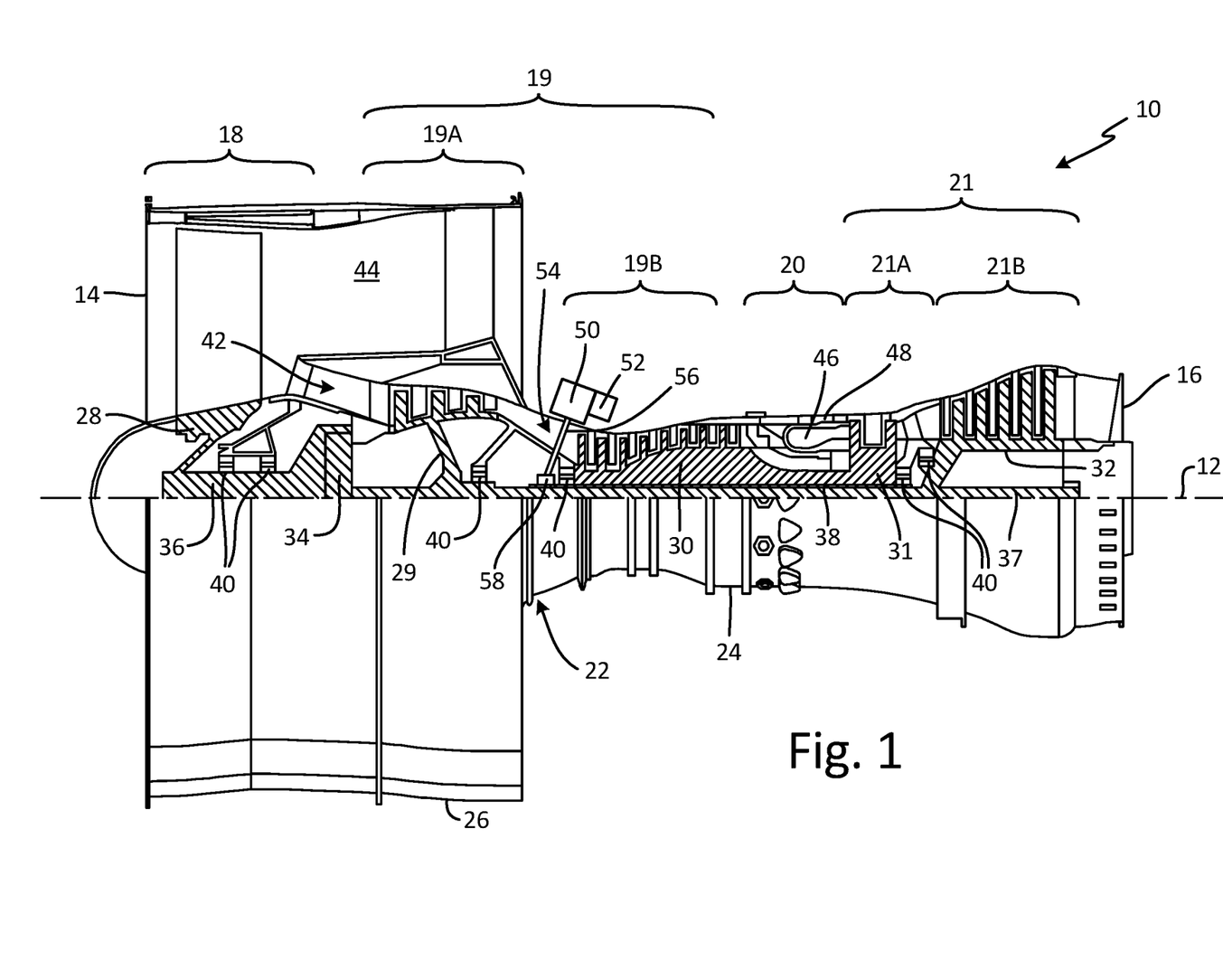
FIG. 1 is a side elevation cutaway view of a gas turbine engine.

FIG. 1 is a side elevation cutaway view of gas turbine engine 10, which is shown as a turbofan engine for an aircraft propulsion system. Gas turbine engine 10 extends along axial centerline 12 between upstream airflow inlet 14 and downstream airflow exhaust 16. Gas turbine engine 10 includes fan section 18, compressor section 19, combustor section 20, and turbine section 21. Compressor section 19 includes low pressure compressor ("LPC") section 19A and high pressure compressor ("HPC") section 19B. Turbine section 21 includes high pressure turbine ("HPT") section 21A and low pressure turbine ("LPT") section 21B.

Fan section 18, compressor section 19, combustor section 20, and turbine section 21 are arranged sequentially along centerline 12 within engine housing 22. Engine housing 22 includes inner case 24 (e.g., a core case) and outer case 26 (e.g., a fan case). Inner case 24 may house one or more of fan section 18, compressor 19, combustor section 20, and turbine section 21 (e.g., an engine core). Outer case 26 may house at least fan section 18. Each of gas turbine engine sections 18, 19A, 19B, 21A and 21B includes respective rotors 28-32. Each of these rotors 28-32 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

Fan rotor 28 is connected to gear train 34, for example, through fan shaft 36. Gear train 34 and LPC rotor 29 are connected to and driven by LPT rotor 32 through low speed shaft 37. The combination of at least LPC rotor 29, LPT rotor 32, and low speed shaft 37 may be referred to as "a low speed spool." HPC rotor 30 is connected to and driven by HPT rotor 31 through high speed shaft 38. The combination of at least HPC rotor 30, HPT rotor 31, and high speed shaft 38 may be referred to as "a high speed spool." Shafts 36-38 are rotatably supported by a plurality of bearings 40, which can be rolling element bearings, thrust bearings, or other types of bearings. Each of these bearings 40 is connected to engine housing 22 by at least one stationary structure such as, for example, an annular support strut.

During operation, air enters gas turbine engine 10 through airflow inlet 14. Air is directed through fan section 18 and is then split into either core gas path 42 or bypass gas path 44. Core gas path 42 flows sequentially through fan section 18, compressor section 19, combustor section 20, and turbine section 21. The air within core gas path 42 may be referred to as "core air." Bypass gas path 44 flows through a duct between inner case 24 and outer case 26. The air within bypass gas path 44 may be referred to as "bypass air."

The core air is compressed by LPC rotor 29 and HPC rotor 30 and directed into combustion chamber 46 of combustor 48 in combustor section 20. Fuel is injected into combustion chamber 46 and mixed with the core air that has been compressed by compressor section 19 to provide a fuel-air mixture. This fuel-air mixture is ignited and combustion products thereof expand and flow through and sequentially cause HPT rotor 31 and LPT rotor 32 to rotate. The rotation of HPT rotor 31 and LPT rotor 32 respectively drive rotation of LPC rotor 29 and HPC rotor 30 and compression of the air received from core gas path 42. The rotation of LPT rotor 32 also drives rotation of fan rotor 28, which propels bypass air through and out of bypass gas path 44. The propulsion of the bypass air may account for a majority of thrust generated by gas turbine engine 10, which can be more than 75% of engine thrust. Gas turbine engine 10 of the present disclosure, however, is not limited to the foregoing exemplary thrust ratio.

Gas turbine engine 10 of FIG. 1 also includes accessory gearbox 50, one or more gearbox attachments 52 and transmission system 54 in a mid-bearing compartment between LPC section 19A and HPC section 19B. Accessory gearbox 50 is mounted to inner case 24. However, in alternative embodiments, accessory gearbox 50 may be mounted elsewhere with gas turbine engine 10, such as to outer case 26. Accessory gearbox 50 is configured to transfer rotational energy (e.g., torque) between transmission system 54 and the one or more gearbox attachments 52. An example of an accessory gearbox is disclosed in U.S. Pat. No. 9,068,515 to Duong et al., which is assigned to the assignee of the present disclosure. Examples of a gearbox attachment may include an air turbine starter, a deoiler, a hydraulic pump, an oil pump, an integrated drive generator, a permanent magnet alternator and a fuel pump module. The present disclosure is not limited to including the foregoing exemplary types or configurations of accessory gearbox 50 or gearbox attachments 52.

Transmission system 54 is configured to mechanically couple and thereby transfer rotational energy (e.g., torque) between a rotating assembly (or component) of gas turbine engine 10 and accessory gearbox 50. In particular, transmission system 54 of FIG. 1 mechanically couples one of the low speed spool or high speed spool of gas turbine engine 10 to the accessory gearbox 50. Transmission system 54 includes high speed shaft 38, tower shaft 56, and geared system 58, which is shown in greater detail in FIG. 2.

Figure 2:
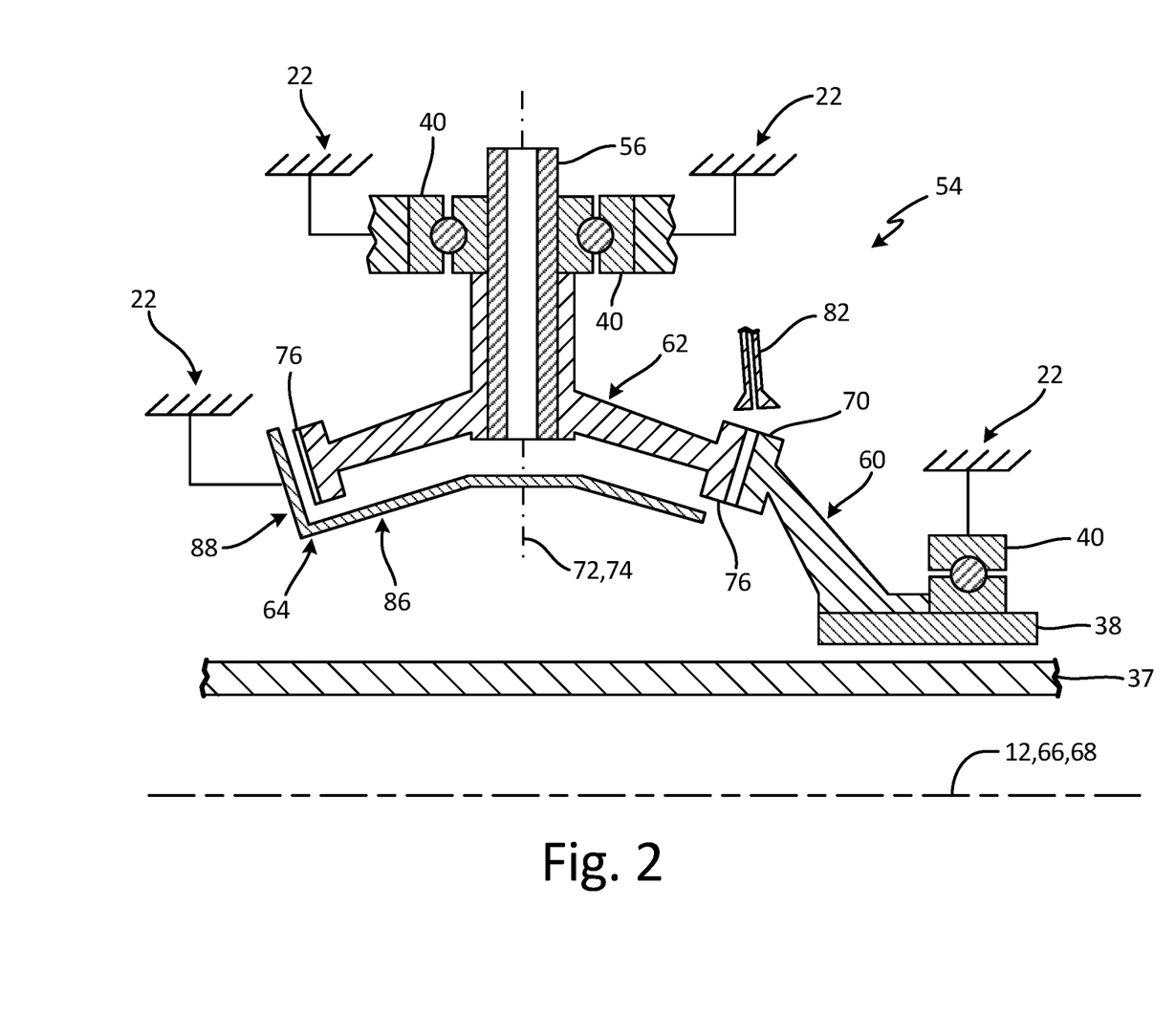
FIG. 2 is a side sectional schematic view of a transmission system.
Figure 3:
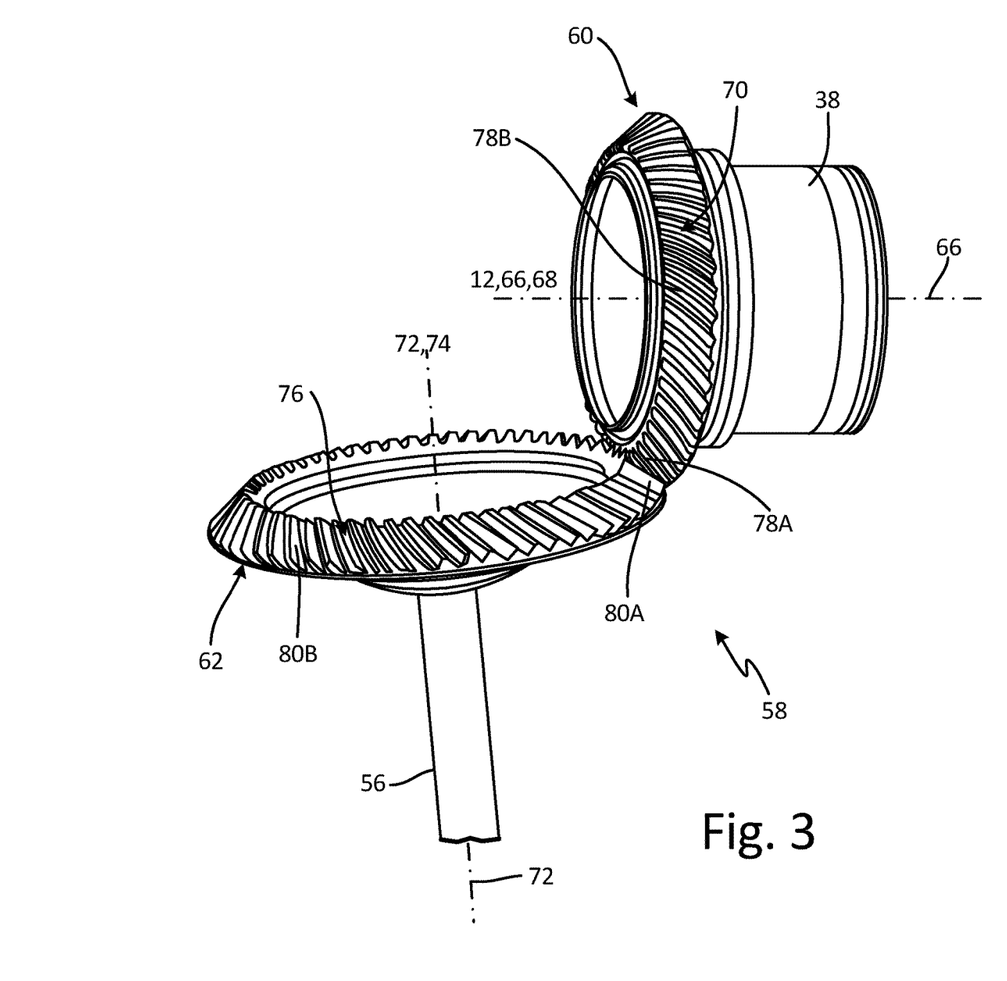
FIG. 3 is a perspective view of a geared system in the transmission system.
Figure 4:
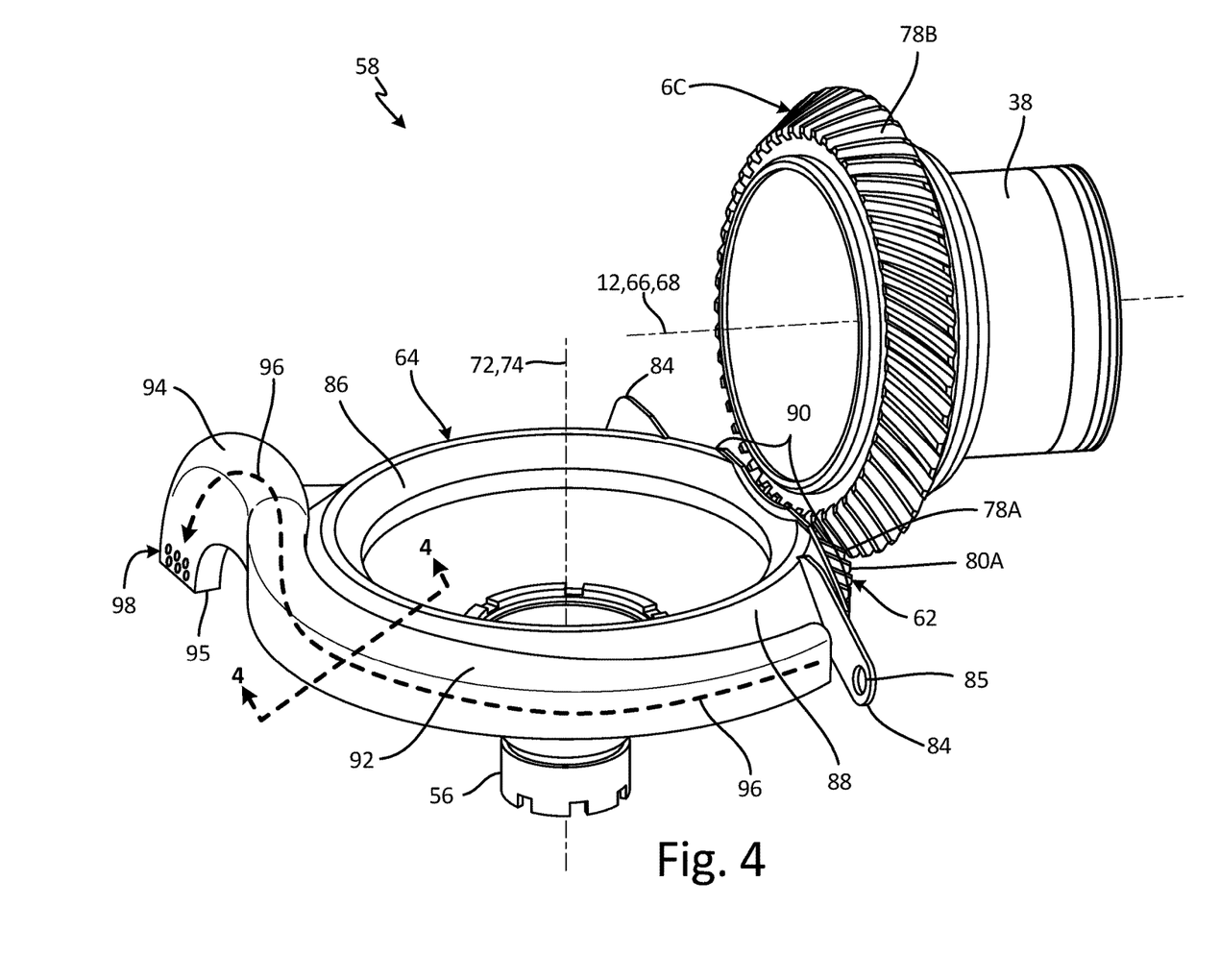
FIG. 4 is a perspective view of the geared system with a baffle.
Figure 4A:
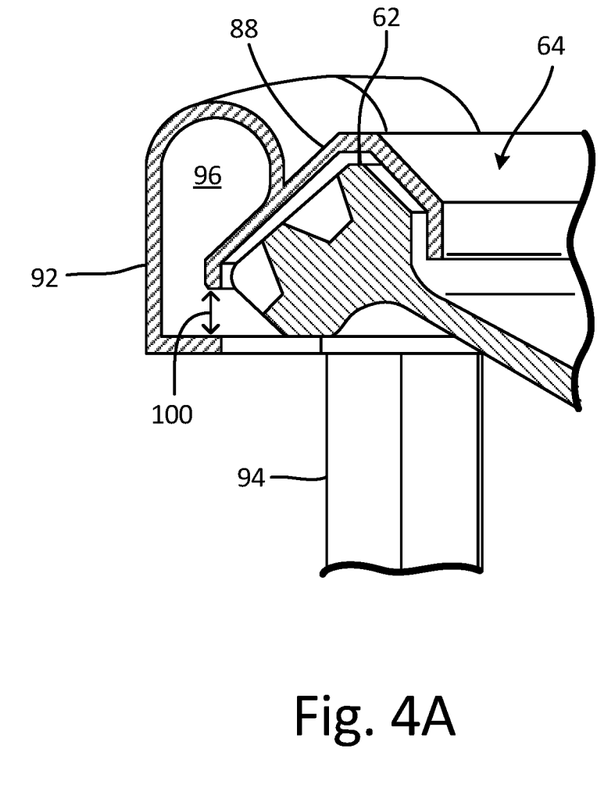
FIG. 4A is sectional view of a portion of a gear and a portion of the baffle of FIG. 4 taken along 4-4.

FIG. 2 is a side sectional schematic view of transmission system 54, FIG. 3 is a perspective view of geared system 58 in transmission system 54, and FIG. 4 is a perspective view of geared system 58 with baffle 64. FIGS. 3, 4, and 4A include view orientations that are inverted from the orientation shown in FIG. 2 so that other features of transmission system 54 can be seen. For example, in FIGS. 3 and 4 tower shaft 56 is directed in a downwards direction, whereas in FIG. 2 tower shaft 56 is directed in an upwards direction.

Transmission system 54 is within a mid-bearing compartment and includes geared system 58, which contains first gear 60, second gear 62, and baffle 64. FIG. 2 shows high speed shaft 38 adjacent to low speed shaft 37 on a radially inner side and to bearing 40 and first gear 60 on a radially outer side. In turn, bearing 40 is connected to engine housing 22. First gear 60 of FIG. 2 is configured as a bevel gear and, in particular, a bull gear. First gear 60 is mounted to high speed shaft 38, for example, by a splined interface. First gear 60 rotates around rotational axis 66, which is coaxial with rotational axis 68 of low speed shaft 37 and centerline 12. FIG. 2 also shows tower shaft 56 connected to second gear 62 and held in place by bearings 40 connected to engine housing 22. Second gear 62 of FIG. 2 is configured as a bevel gear and is mounted to tower shaft 56, for example, by a splined interface. Second gear 62 rotates around rotational axis 72, which is coaxial with rotational axis 74 of tower shaft 56. Rotational axis 72 is arranged coincident with and at least generally (e.g., within plus or minus one or two degrees) perpendicular to the rotational axis 66 of first gear 60. However, in other embodiments, the rotational axis 72 of second gear 62 may be arranged coincident with and acutely or obtusely angled to the rotational axis 66 of first gear 60. Additionally, FIG. 2 shows an angle of rotational axis 74 of tower shaft 56 to be approximately perpendicular to centerline 12, but in other non-limiting embodiments can be at another angle such as shown in FIG. 1. It is to be noted both Nozzle 82 provides lubricant, such as oil, to first gear 60 and second gear 62 to cool and reduce friction between first gear 60 and second gear 62.

Shown in FIG. 3, first gear 60 includes first set of gear teeth 70, with first set of gear teeth 70 having first meshed subset 78A and first unmeshed subset 78B. Second gear 62 includes second set of gear teeth 76, with second set of gear teeth 76 having second meshed subset 80A and second unmeshed subset 80B. Second meshed subset 80A meshes and engages with first meshed subset 78A of first set of gear teeth 70 to transfer torque between high speed shaft 38 and tower shaft 56. The configuration of first gear 60, second gear 62, and their components and how they interact with one another is generally understood in the art.

First set of gear teeth 70 of first gear 60 is arranged in a circumferential array, which extends circumferentially around rotational axis 66. First set of gear teeth 70 is configured to provide first gear 60 with an annular, conically-shaped pitch surface. First set of gear teeth 70 is further configured to provide first gear 60 with a spiral (or helical) bevel gear configuration. However, in other non-limiting embodiments, first set of gear teeth 70 may be configured to provide first gear 60 with a straight bevel gear configuration, a Zerol® bevel gear configuration, a hypoid bevel gear configuration, a double spiral (or helical) bevel gear configuration, or another type of bevel gear configuration.

Second set of gear teeth 76 of second gear 62 is arranged in a circumferential array, which extends circumferentially around rotational axis 72. Second set of gear teeth 76 is configured to provide second gear 62 with an annular, conically shaped pitch surface. Second set of gear teeth 76 are further configured to provide second gear 62 with a spiral (or helical) bevel gear configuration. However, in other non-limiting embodiments, second set of gear teeth 76 may be configured to provide second gear 62 with a straight bevel gear configuration, a Zerol® bevel gear configuration, a hypoid bevel gear configuration a double spiral (or helical) bevel gear configuration, or another type of bevel gear configuration.

Second set of gear teeth 76 of second gear 62 is meshed (i.e., mated and engaged) with first set of gear teeth 70 of first gear 60. In particular, first meshed subset 78A of first set of gear teeth 70 are meshed with second meshed subset 80A of second set of gear teeth 76, where each of first meshed subset 78A and second meshed subset 80A includes a plurality of gear teeth. With the foregoing meshed configuration, first set of gear teeth 70 also includes first unmeshed subset 78B, which is a subset of gear teeth that are not meshed and are disengaged from second set of gear teeth 76, and second set of gear teeth 76 includes second unmeshed subset 80B, which is a subset of second set of gear teeth 76 that is not meshed and is disengaged from first set of gear teeth 70. The specific gear teeth in each of first set of gear teeth 70 and second set of gear teeth 76 will change as the respective first gear 60 and second gear 62 rotate about their respective rotational axes.

Figure 5:
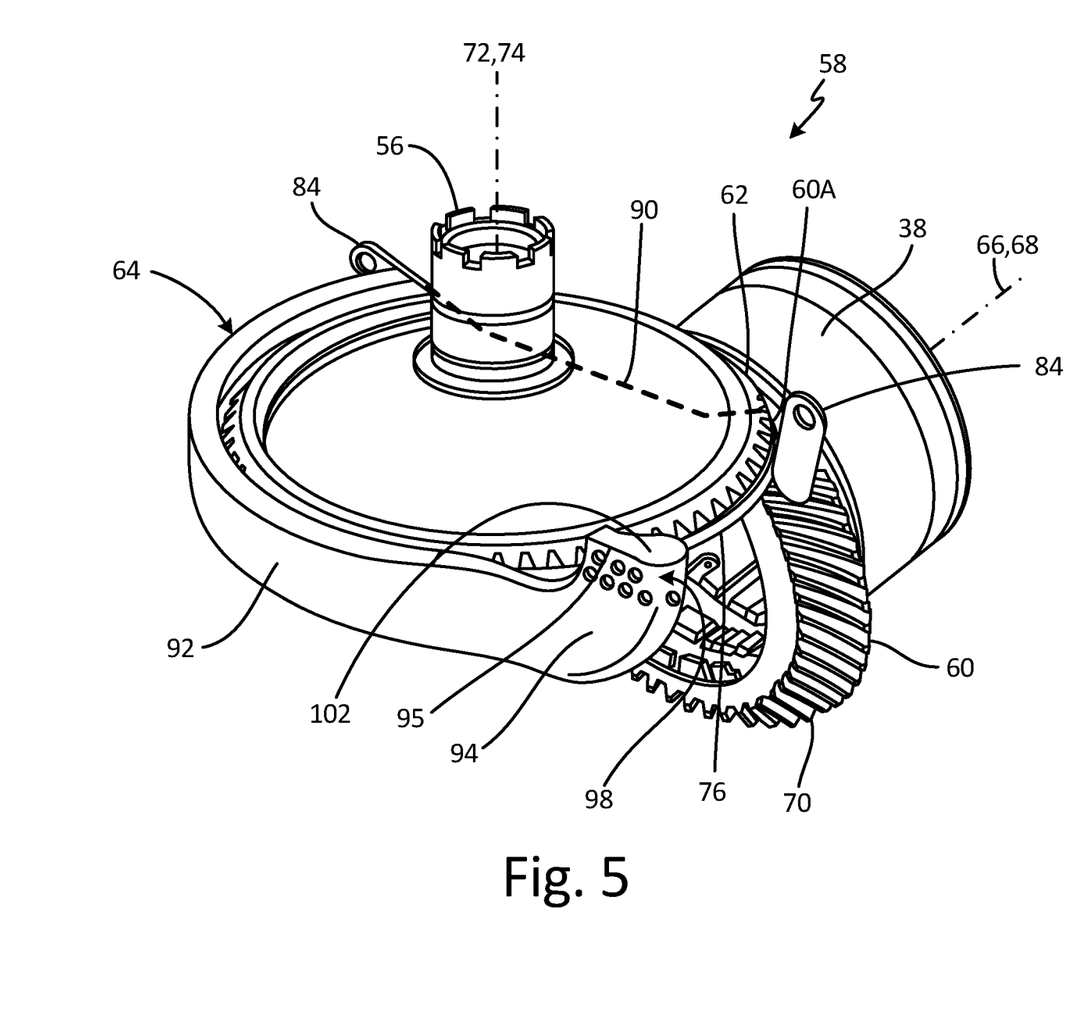
FIG. 5 is another perspective view of the geared system with the baffle.

Shown in FIGS. 2 and 4, baffle 64 is arranged with (i.e., positioned next to and in close proximity with) second gear 62 so as to surround and cover a region of second gear 62 as described below in further detail. As shown in FIGS. 4-5, baffle 64 includes flanges 84 (with attachment area 85), disk 86, rim 88 (including window 90—shown in phantom in FIG. 5), and peripheral portion 92 (including outlet 94 with distal end 95, channel 96, and series of openings 98).

Flanges 84 are flat pieces of solid material extending out from baffle 64. Flanges 84 can have any shape or configuration, can include one or multiple holes that are configured to accommodate bolts, rivets, or other fasteners or can have other attachment means, such as ridges, mounds, or a surface that is able to be welded, brazed, and/or adhered. Additionally, while FIGS. 4 and 5 show baffle 64 having two flanges 84, baffle 64 can have any number of flanges 84 or can be configured to have no flanges 84 and instead attach to a support structure another way. Attachment area 85 is a hole or other feature allowing for attachment and is configured to allow baffle 64 to attach to a support structure (such as engine housing 22 or a wall of the mid-bearing compartment in which transmission system 54 is located) to keep baffle 64 stationary in relation to first gear 60 and second gear 62.

Disk 86 (also referred to as a frustoconical portion) is a radially interior portion of baffle 64. While disk 86 is shown with a flat portion and an angled portion, disk 86 can be flat such that the entirety of disk 86 is in one plane, or can be another shape, such as semispherical or generally conical. Disk 86 can have a shape that is similar to an inner side of second gear 62, as is shown in FIG. 4, to more closely surround second gear 62. The flat portion can have one or multiple holes that are configured to accommodate bolts, rivets, or other fasteners or can have other attachment means, such as ridges, mounds, or a surface that is able to be welded, brazed, and/or adhered. Further, as will be described in regards to FIG. 4A, baffle 64 does not need to include disk 86 and rather can have a ring with an aperture in a middle of baffle 64 that allows for a shaft or another component to extend through baffle 64.

Rim 88 is an annular band of solid material and is generally hollow and frustoconical in shape. Window 90 is a cut out of rim 88, with the portion shown in FIG. 4 shaped by a chord drawn between two points on a radially outer side of the circular rim 88 and removing the smaller portion so that window 90 has a straight side. While window 90 is shown to have a straight side with baffle 64, window 90 can have another configuration, such as a radially inwardly rounded side, a radially outwardly rounded side, a side having a stair-stepped shape, or a side having more than one radius of curvature. Peripheral portion 92 is a duct or conduit with a generally annular geometry. Outlet 94 is an opening. Distal end 95 of outlet 94 is an end of outlet 94. Channel 96 is a fluidic passageway. Series of openings 98 is a set of passages extending through a surface of outlet 94.

Flanges 84 are attached to or formed as a part of baffle 64. Flanges 84 allow for baffle 64 to be attached to a support structure via attachment area to keep baffle 64 stationary in relation to first gear 60 and second gear 62. Disk 86 is connected to and radially inward from rim 88. Disk 86 and rim 88 can be separate pieces connected to one another through various fastening means, including bolts, rivets, welds, brazing, adhesive, or another fastener. However, as shown in the disclosed embodiments, all components of baffle 64, including disk 86 and rim 88, can be one continuous and monolithic piece. Rim 88 is radially outward from disk 86 and surrounds second unmeshed subset 80B of second set of gear teeth 76. Rim 88 is configured to cover second unmeshed subset 80B of second set of gear teeth 76. Rim 88 has window 90 adjacent to the area where second gear 62 meshes with first gear 60 so that rim 88 does not cover second meshed subset 80A of second set of gear teeth 76 (i.e., leaves second meshed subset 80A uncovered and exposed so as to be able to mesh with first meshed subset 78A without rim 88 contacting first gear 60).

Window 90 is a cut-out of rim 88 adjacent to an area where first gear 60 meshes with second gear 62. Window 90 is sized and shaped such that a portion of second gear 62 (the portion that includes second meshed subset 80A) extends radially through window 90 and meshes with first gear 60. Window 90 is also sized and shaped to enable nozzle 82 to direct lubricant onto first set of gear teeth 70 and second set of gear teeth 76. Peripheral portion 92 is adjacent to and radially outward from rim 88. Peripheral portion 92 also is connected to and circumferentially surrounds rim 88. Peripheral portion 92 extends at least partially circumferentially around second rotational axis 72. Outlet 94 is fluidly connected to peripheral portion 92 via channel 96. Distal end 95 of outlet 94 is located on an end of outlet 94 that is disposed on an opposite end of outlet 94 as peripheral portion 92.

Channel 96 extends through peripheral portion 92 and outlet 94. Channel 96 is fluidly connected to second gear 62. Channel 96 also fluidly connects peripheral portion 92 and outlet 94. Series of openings 98 extend through a surface of outlet 94. Series of openings 98 is fluidly connected to channel 96 of peripheral portion 92.

Rim 88 enables a lubricant system, such as nozzle 82 shown in FIG. 2, to direct lubricant onto first set of gear teeth 70 and/or second set of gear teeth 76 just prior to and/or at the area where those gear teeth mesh with one another (see FIG. 3). Rim 88 substantially prevents second unmeshed subset 80B of second set of gear teeth 76 from being impinged by or otherwise receiving additional lubricant that is churning or otherwise moving around the mid-bearing compartment in which transmission system 54 is located. Such additional lubricant, if allowed to impinge second unmeshed subset 80B of second set of gear teeth 76, increases second gear 62 windage and decreases the efficiency of transmission system 54 and, thus, gas turbine engine 10 due to the contact between lubricant and second gear 62.

Peripheral portion 92 with outlet 94 is configured to direct a majority of the lubricant away from the second unmeshed subset 80B of second set of gear teeth 76 (see FIG. 2). This in turn reduces windage on the second gear teeth 76 and, thereby, further increases transmission system 54 efficiency (see FIG. 2). Lubricant in channel 96 is directed towards outlet 94 in order to move lubricant away from the second gear 62. Channel 96 can be configured to direct the lubricant in a direction of rotation of second unmeshed subset 80B of second set of gear teeth 76. Series of openings 98 is configured to transfer lubricant from channel 96 out of outlet 94.

Without peripheral portion 92 with outlet 94 connected to baffle 64, lubricant is trapped in the space between second set of gear teeth 76 and the inner side of rim 88, increasing windage and impingement of lubricant on second set of gear teeth 76 and thereby decreasing efficiency of transmission system 54 and, thus, gas turbine engine 10.

FIG. 4A is sectional view of a portion of second gear 62 and a portion of baffle 64 of FIG. 4 taken along 4-4. FIG. 4A shows second gear 62, baffle 64, rim 88, peripheral portion 92, outlet 94, channel 96, and slot 100.

Slot 100 is a partially-annular, band-shaped space or gap (extending in an axial direction of rotational axis 72 as shown in FIGS. 2 and 3) between portions of peripheral portion 92. Slot 100 is disposed in peripheral portion 92 and is fluidly connected to channel 96, second gear 62, and baffle 64. In this example, slot 100 forms a gap and extends from a portion of peripheral portion 92 to a radially outward portion of rim 88 of baffle 64. For example, slot 100 is tangent to peripheral portion 92 and is tangent to a radially outward portion of rim 88. Additionally, slot 100 also fluidly connects channel 96 of peripheral portion 92 with rim 88. Slot 100 is configured to receive lubricant from second gear 62 and transfer the lubricant into channel 96. Slot 100 is also configured to allow lubricant to flow through slot 100 and into channel 96. Slot 100, in combination with peripheral portion 92, allows for lubricant to be transported away from second gear 62. Transporting lubricant away from second gear 62 decreases windage of the lubricant within baffle 64 as well as impingement of the lubricant back onto second gear 62 which increases the efficiency of transmission system 54 and, thus, gas turbine engine 10.

FIG. 5 is another perspective view of geared system 58 with baffle 64. FIG. 5 includes a view orientation that is inverted from the orientation shown in FIGS. 3, 4, and 4A so that other features of geared system 58 can be seen. For example, in FIG. 5 tower shaft 56 is directed in a upwards direction, whereas in FIGS. 3 and 4 tower shaft 56 is directed in an downwards direction.

In addition to geared system 58 with tower shaft 56, first gear 60, second gear 62, baffle 64, rotational axis 66, rotational axis 68, first set of gear teeth 70, rotational axis 72, rotational axis 74, second set of gear teeth 76, flanges 84, peripheral portion 92, outlet 94, and series of openings 98, FIG. 5 shows cover 102 disposed on distal end 95 of outlet 94.

Cover 102 is a plate or a flat piece of solid material which is disposed on distal end 95 of outlet 94. In one non-limiting embodiment, cover 102 is integrally formed with outlet 94. In other non-limiting embodiments, cover 102 is mechanically or chemically attached to outlet 94. Cover 102 fluidly caps or closes outlet 94 such that cover 102 prevents a flow of fluid through an end of outlet 94. In other non-limiting embodiments (see FIGS. 6A—6C), cover 102 can include various configurations allowing for the passage of some fluid past cover 102.

Outlet 94 with cover 102 and series of openings 98 is configured to slow a velocity of a fluid passing from channel 96 and out of outlet 94. As fluid (for example lubricant) travels from channel 96 and through outlet 94, the lubricant strikes cover 102 which absorbs a portion of the kinetic energy of the lubricant. As lubricant strikes cover 102, the lubricant pools up until a level of the lubricant reaches series of openings 98 at which point the lubricant is drained out of series of openings 98. After cover 102 has absorbed a portion of the kinetic energy of the lubricant, the lubricant then exits outlet 94 via series of openings 98 with a lesser velocity than if cover 102 were not blocking the opening of outlet 94. The combination of series of openings 98 and cover 102 causes the lubricant to drain out of outlet 94 instead of being expelled from outlet 94 with a higher than desired rate of velocity. The lubricant within outlet 94 exits through series of openings 98 partly due to gravity and partly due to windage (air flow created by second gear 62) through channel 96.

The advantage here is that without cover 102 and series of openings 98 to slow down the lubricant as it exits outlet 94, lubricant exits outlet 94 and impacts nearby components or the compartment walls with a high rate of velocity. The lubricant may also become entrained into other rotating components (bearings, seal plates, unbaffled gears, etc.) before the lubricant can make it to the compartment sump and be scavenged out. Entrainment of the lubricant can generate excess heat and reduce scavenge system effectiveness. Baffle 64 with series of openings 98 and cover 102 reduces the energy of the lubricant leaving baffle 64 via outlet 94 while still directing the lubricant into a location in the bearing compartment that is desirable from the perspective of compartment efficiency.

Figure 6A:
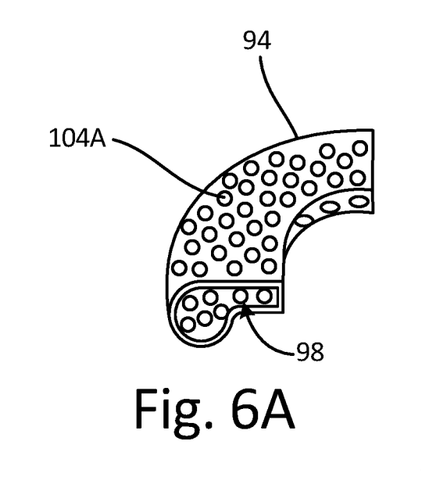
FIG. 6A is a perspective view of a baffle outlet with a series of holes.
Figure 6B:
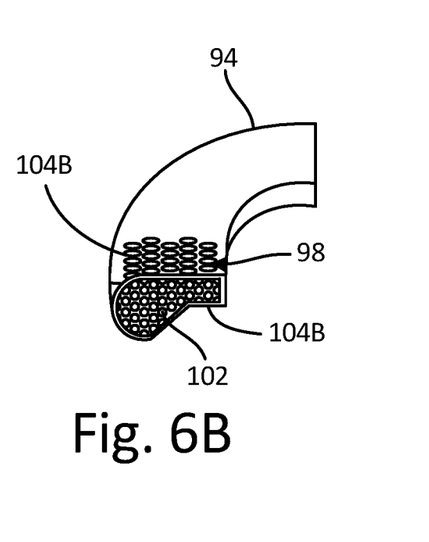
FIG. 6B is a perspective view of a baffle outlet with a series of screens.
Figure 6C:
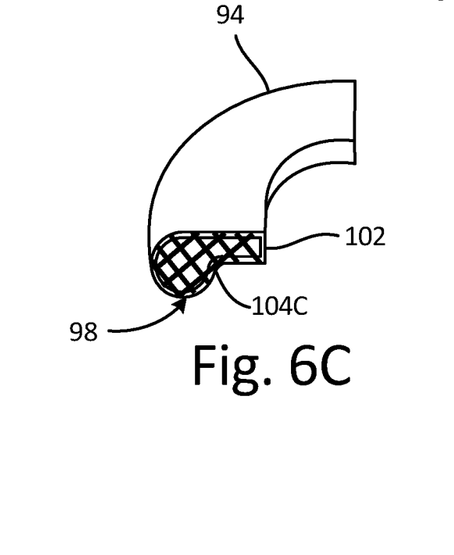
FIG. 6C is a perspective view of a baffle outlet with mesh.

The orientation of FIGS. 6A, 6B, and 6C is similar to the orientation shown in FIGS. 4 and 4A. FIG. 6A is a perspective view of outlet 94 with holes 104A. Holes 104A includes a series of apertures or orifices in and along a surface of outlet 94. In one non-limiting embodiment, holes 104A include a circular shape, however in other non-limiting embodiments, the shape of holes 104A can include non-circular shapes. In FIG. 6A, outlet 94 is shown as not including cover 102. In another non-limiting embodiment, outlet 94 can include cover 102 which also include holes 104A (see FIG. 6B). Also as shown in FIG. 6A, holes 104A are disposed at locations extending completely around an exterior of outlet 94, as well as spreading out along an entire length of outlet 94. In other non-limiting embodiments, holes 104A can extend partially around an exterior of outlet 94, as well as spreading along a partial length of outlet 94.

FIG. 6B is a perspective view of outlet 94 with screens 104B. Screens 104B are surfaces with a series of patterned openings. In one non-limiting embodiment, screens 104B include a circular shape, however in other non-limiting embodiments, the shape of screens 104B can include non-circular shapes. Screens 104B are disposed along cover 102 and along a portion of outlet 94. In other non-limiting embodiments, screens 104B can be disposed along a portion of cover 102 and/or along an entire length of outlet 94. Also as shown in FIG. 6B, screens 104B are disposed at locations extending completely around an exterior of outlet 94, as well as spreading out along a partial length of outlet 94. In other non-limiting embodiments, screens 104B can extend partially around an exterior of outlet 94, as well as not being spread along any portion of the length of outlet 94.

FIG. 6C is a perspective view of outlet 94 with mesh 104C. Mesh 104C is a surface with a series of patterned openings. In one non-limiting embodiment, mesh 104C includes openings with a parallelogram shape, however in other non-limiting embodiments, the shape of the openings in mesh 104C can include non-parallelogram shapes. Mesh 104C is disposed along cover 102. In other non-limiting embodiments, mesh 104C can be disposed along a portion of cover 102 and/or along a portion of the exterior of outlet 94. In other non-limiting embodiments, mesh 104C can extend completely around an exterior of outlet 94, as well as spreading along an entire length of outlet 94.

The shapes, patterns, areas of coverage, and configurations of series of openings 98 and cover 102, such as holes 104A, screens 104B, and mesh 104C, can be set and/or adjusted to control the flow of lubricant out of outlet 94 to account for desired design and performance characteristics of transmission system 54.

Discussion of Possible Embodiments

The following are non-exclusive descriptions of possible embodiments of the present invention.

A baffle includes a disk, a rim, a peripheral portion, and/or an outlet. The rim is connected to and circumferentially surrounds a portion of the disk. The peripheral portion is connected to and circumferentially surrounds the rim. The peripheral portion forms a channel. The outlet is fluidly connected to the channel of the peripheral portion. The outlet includes a cover and a series of openings. The cover caps a distal end of the outlet. The series of openings is disposed on a portion of the outlet and is fluidly connected to the channel via the outlet.

The baffle of the preceding paragraph can optionally include, additionally and/or alternatively, any one or more of the following features, configurations and/or additional components:

A slot can be disposed in the peripheral portion and/or can be fluidly connected to the channel.

The slot can be configured to allow lubricant to flow through the slot and/or into the channel.

The outlet with the cover and the series of openings can be configured to slow a velocity of a fluid passing from the channel and out of the outlet.

The outlet with the cover and the series of openings can be configured to remove energy from a fluid passing from the channel and out of the outlet.

A flange can be connected to the rim.

A transmission assembly includes a first gear, a second gear, and/or a baffle. The first gear includes a first set of gear teeth. The second baffle includes a second set of gear teeth meshed with the first set of gear teeth. The baffle surrounds a subset of the second set of gear teeth and includes a disk, a rim, a peripheral portion, a slot, and an outlet. The rim is connected to and circumferentially surrounds a portion of the disk. The peripheral portion is connected to and circumferentially surrounds the rim. The peripheral portion forms a channel. The slot is disposed in the peripheral portion and is in fluid communication with the second set of gear teeth. The slot can be configured to allow lubricant to flow through the slot and into the channel. The outlet is fluidly connected to the channel of the peripheral portion. The outlet includes a cover and a series of openings. The cover caps a distal end of the outlet. The series of openings is disposed on a portion of the outlet and is fluidly connected to the channel via the outlet.

The assembly of the preceding paragraph can optionally include, additionally and/or alternatively, any one or more of the following features, configurations and/or additional components:

The baffle can further comprise a window adjacent to the first gear, wherein a portion of the second set of gear teeth can extend radially through the window.

The window can be configured to prevent the baffle from coming into contact with the first gear.

The rim of the baffle can be configured to prevent the subset of the second set of gear teeth from receiving the lubricant.

A shaft can be attached at a first end to the second gear and/or at a second end to a gearbox.

A shaft can be attached to the first gear, the shaft can be a high speed shaft in a gas turbine engine.

A nozzle can be configured to apply lubricant to the second set of gear teeth.

The rim can comprise a hollow frustoconical shape that can surround a subset of the second gear teeth.

The channel can be configured to direct the lubricant in a direction of rotation of the subset of gear teeth towards the baffle outlet.

A nozzle can be configured to apply lubricant to the second set of gear teeth.

A flange can be connected to and/or extend outward from the rim, the flange can have an attachment area configured to allow the baffle to attach to a support structure.

The outlet with the cover and the series of openings can be configured to slow a velocity of a fluid passing from the channel and out of the outlet.

The outlet with the cover and the series of openings can be configured to remove energy from a fluid passing from the channel and out of the outlet.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A baffle comprising:
   a disk;
   a rim connected to and circumferentially surrounding a portion of the disk;
   a peripheral portion connected to and circumferentially surrounding the rim, the peripheral portion forming a channel;
   a slot disposed in the peripheral portion, wherein the slot extends from the peripheral portion to a radially outward portion of the rim, wherein a shape of the slot includes a partially annular band, wherein the slot fluidly connects the channel of the peripheral portion with the rim; and
   an outlet fluidly connected to the channel of the peripheral portion, wherein the outlet comprises:
      a cover covering a distal end of the outlet; and
      a series of openings disposed on a portion of the outlet, wherein the series of openings is fluidly connected to the channel via the outlet.

2. The baffle of claim 1, wherein the slot is configured to allow lubricant to flow through the slot and into the channel.

3. The baffle of claim 1, wherein the outlet with the cover and the series of openings is configured to slow a velocity of a fluid passing from the channel and out of the outlet.

4. The baffle of claim 1, wherein the outlet with the cover and the series of openings is configured to remove energy from a fluid passing from the channel and out of the outlet.

5. The baffle of claim 1, further comprising a flange connected to the rim.

6. A transmission assembly comprising:
a first gear with a first set of gear teeth;
a second gear with a second set of gear teeth meshed with the first set of gear teeth;
a baffle surrounding a subset of the second set of gear teeth, the baffle comprising:
a disk;
a rim connected to and circumferentially surrounding a portion of the disk;
a peripheral portion connected to and circumferentially surrounding the rim, the peripheral portion forming a channel;
a slot disposed in the peripheral portion and in fluid communication with the second set of gear teeth, wherein the slot is configured to allow lubricant to flow through the slot and into the channel, wherein the slot extends from the peripheral portion to the rim, wherein a shape of the slot includes a partially annular band, wherein the slot fluidly connects the channel of the peripheral portion with the rim; and
an outlet fluidly connected to the channel of the peripheral portion, wherein the outlet comprises:
a cover covering a distal end of the outlet; and
a series of openings disposed on a portion of the outlet, wherein the series of openings is fluidly connected to the channel via the outlet.

7. The assembly of claim 6, wherein the baffle further comprises a window adjacent to the first gear, wherein a portion of the second set of gear teeth extends radially through the window.

8. The assembly of claim 7, wherein the window is configured to prevent the baffle from coming into contact with the first gear.

9. The assembly of claim 6, wherein the rim of the baffle is configured to prevent the subset of the second set of gear teeth from receiving the lubricant.

10. The assembly of claim 6, further comprising:
a shaft attached at a first end to the second gear and at a second end to a gearbox.

11. The assembly of claim 6, further comprising:
a shaft attached to the first gear, the shaft being a high speed shaft in a gas turbine engine.

12. The assembly of claim 6, further comprising:
a nozzle configured to apply lubricant to the second set of gear teeth.

13. The assembly of claim 6, wherein the rim comprises a hollow frustoconical shape that surrounds a subset of the second gear teeth.

14. The assembly of claim 6, wherein the channel is configured to direct the lubricant in a direction of rotation of the subset of gear teeth towards the baffle outlet.

15. The assembly of claim 6, further comprising:
a flange connected to and extending outward from the rim, the flange having an attachment area configured to allow the baffle to attach to a support structure.

16. The baffle of claim 6, wherein the outlet with the cover and the series of openings is configured to slow a velocity of a fluid passing from the channel and out of the outlet.

17. The baffle of claim 6, wherein the outlet with the cover and the series of openings is configured to remove energy from a fluid passing from the channel and out of the outlet.

* * * * *